US006765782B2

(12) United States Patent
Schabbach

(10) Patent No.: US 6,765,782 B2
(45) Date of Patent: Jul. 20, 2004

(54) CAPACITOR AND A METHOD TO MANUFACTURE THE CAPACITOR

(75) Inventor: Gilvan Schabbach, Porto Alegre (BR)

(73) Assignee: EPCOS do Brazil LTDA (BR)

( * ) Notice: Subject to any disclaimer, the term of this patent is extended or adjusted under 35 U.S.C. 154(b) by 0 days.

(21) Appl. No.: 10/221,635

(22) PCT Filed: Mar. 14, 2001

(86) PCT No.: PCT/IB01/00374
§ 371 (c)(1),
(2), (4) Date: Nov. 14, 2002

(87) PCT Pub. No.: WO01/69615
PCT Pub. Date: Sep. 20, 2001

(65) Prior Publication Data
US 2003/0103316 A1 Jun. 5, 2003

(30) Foreign Application Priority Data
Mar. 15, 2000 (BR) .............................................. 0001310

(51) Int. Cl.⁷ ............................. H01G 4/06; H01G 4/232
(52) U.S. Cl. ..................... 361/311; 361/308.3; 29/25.42
(58) Field of Search ........................... 361/301.1–301.4, 361/302–303, 306.1, 306.3, 307, 308.1, 308.2, 308.3, 309, 311–312, 323; 29/25.42

(56) References Cited

U.S. PATENT DOCUMENTS 3,731,130 A * 5/1973 Dutta ......................... 361/272
5,368,811 A * 11/1994 Taniguchi et al. .......... 364/567
5,403,454 A    4/1995 Taniguchi et al.

FOREIGN PATENT DOCUMENTS

| JP | 2-155215 | * 6/1990 | ............ H01G/4/24 |
| JP | 4-61108 | * 2/1992 | ............ H01G/4/32 |
| JP | 7-183160 | * 7/1995 | ............ H01G/4/224 |

* cited by examiner

Primary Examiner—Dean A. Reichard
Assistant Examiner—Eric Thomas
(74) Attorney, Agent, or Firm—Schiff Hardin LLP

(57) ABSTRACT

A capacitor includes a capacitive element, which is formed by a plurality of metallic electrodes or films and has contact terminals, and a thermo shrinkable cover applied directly on the capacitive element. A method for manufacturing the capacitor includes a step where a thermo shrinkable tube is applied directly on the capacitive element and in a following step the thermo shrinkable tube is heated to shrink it onto the capacitor element to from the cover.

6 Claims, 2 Drawing Sheets

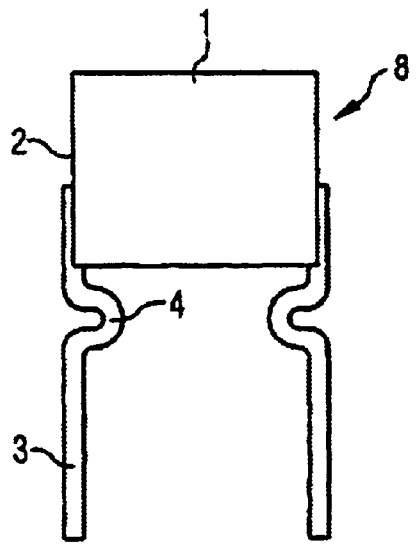
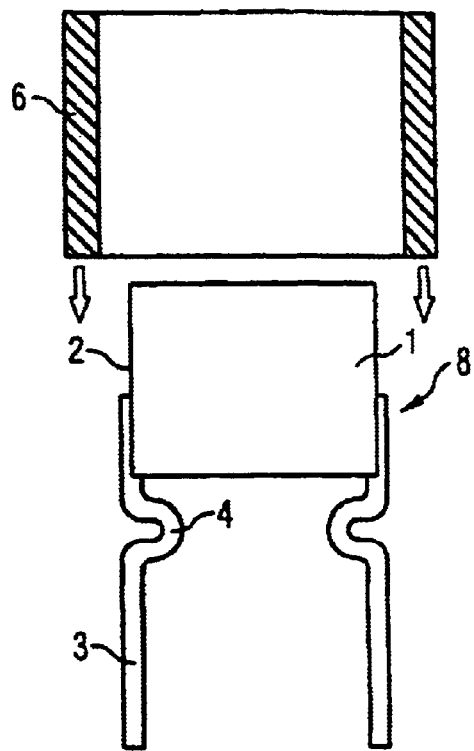
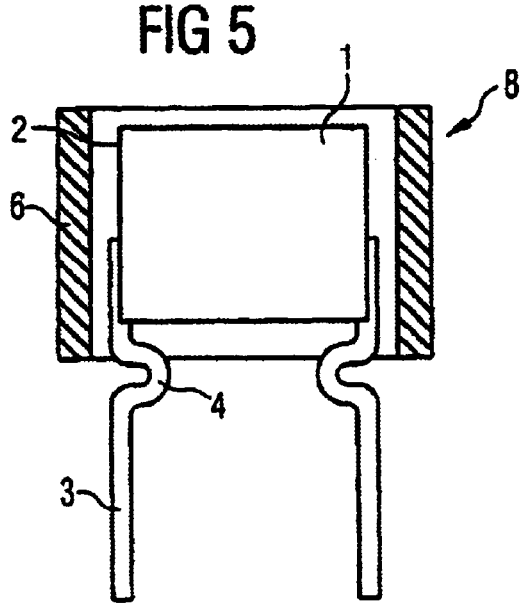
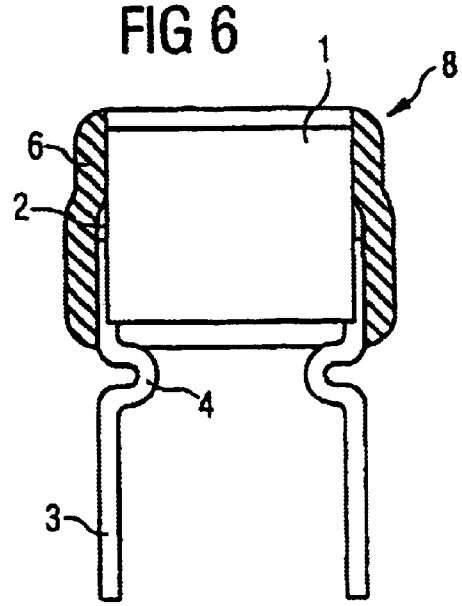

CAPACITOR AND A METHOD TO MANUFACTURE THE CAPACITOR

BACKGROUND OF THE INVENTION

The invention is directed to a capacitor, particularly a dry capacitor, which can be made from metallized plastic films or a plastic film and metallic foils as the plates, with an external protection provided by a shrinkable tube.

Capacitors are electronic components, used in electro-electronic devices. The capacitor comprises a capacitive element, which is formed by two plates or films and one dielectric, which are either wound or stacked. The capacitive element is connected to elements of an electrical circuit by terminals. With an electrical current applied to these terminals, the capacitor is loaded with an electrical load.

There are a lot of different types of capacitors: film capacitors (polyester or polypropylene), ceramic, electrolytic, tantalum, etc. This invention is applicable to any of these types, which may be a dry capacitor (without a presence of a liquid substance in its composition) that needs a cover to provide a mechanical and/or electrical protection.

The capacitors normally need an external cover in order to be handled without mechanical damages during the assembling in the circuit. This cover has the function to protect the capacitor and the neighbor components from short circuits, which could damage the whole circuit, to assure the mechanical robustness to the capacitors during the handling and to assure the attachment of the terminals during a soldering process.

There are known capacitors in a naked version (without protection cover), which are boxed in plastic cans and covered by epoxy powder resin.

Most of the plastic capacitors are covered by one of the processes mentioned above. The naked version has application in some restricted fields, because it is sensitive to mechanical agents and soldering processes.

The covering techniques provide the capacitors with the necessary protection against external mechanical agents, as well as from a contact with the neighbor components, to avoid short circuits.

SUMMARY OF THE INVENTION

The object of the invention is to provide a capacitor with one protection system against mechanical and electrical external agents, in a simple and cheap manner, by avoiding the use of the known plastic can and by using a shrinkable tube, which is shrunk directly on the capacitive element.

The objective is reached using a capacitor, particularly a dry capacitor, formed by a capacitive element, contact terminals and the capacitive element has a thermo shrinkable plastic tube, which is applied directly on the capacitive element.

The invention is also directed to a capacitor manufacturing method using a thermo shrinkable material which is applied directly on the capacitive element without using the well-known plastic can. Thus, the method makes the production cheaper.

The objective is reached using a manufacturing method, particularly a dry capacitor manufacturing method, by providing the capacitor formed by a capacitive element and contact terminals, applying a thermo shrinkable tube directly on the capacitive element and then heating to shrink the thermo shrinkable tube onto the capacitive element.

BRIEF DESCRIPTION OF THE DRAWINGS

FIG. 3 is a side view of the capacitive element without the thermo plastic shrinkable material cover;

FIG. 4 is a side view with portions broken away for purposes of illustration of the capacitive element with the thermo shrinkable tube being prepared for insertion onto the capacitive element;

FIG. 5 is a side view with portions broken away for purposes of illustration of the capacitive element surrounded by the thermo shrinkable tube; and FIG. 6 is a side view with portions broken away for purposes of illustration of the finished capacitor after shrinking the thermo shrinkable tube onto the capacitive element.

DESCRIPTION OF THE PREFERRED EMBODIMENT

Figure 1A:
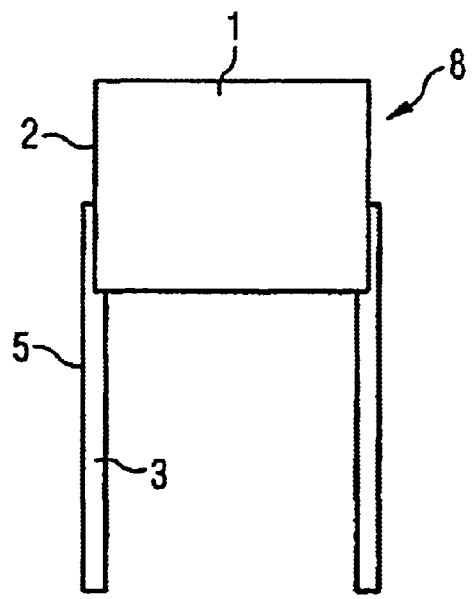
FIG. 1A is a side view of a capacitive element having straight terminals without the protection cover.
Figure 1B:
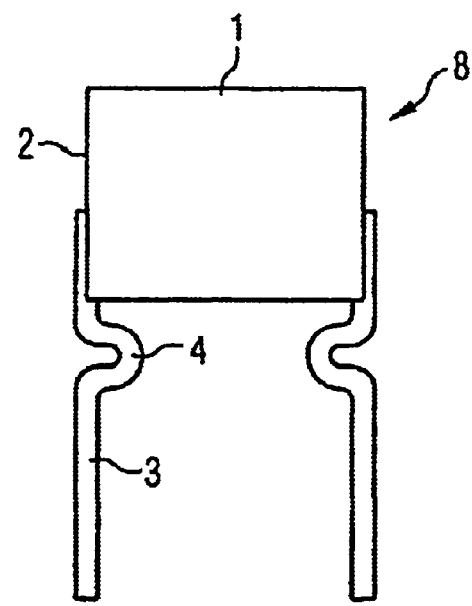
FIG. 1B is a side view of a capacitive element with preformed terminals without the protection cover.

Each of FIG. 1A and 1B illustrates a wound capacitive element 1 for a capacitor 8 without the protection cover 6, which is formed by the plastic dielectric, and metallic electrode or film 2 or metallic zone 2, which can be of metal deposited by melted metal spray or simply the metallic film 2. The terminals 3 are connected to an outer surface of the capacitive element 1 and can either be preformed 4 (FIG. 1B) or straight 5 (FIG. 1A). The terminals 3 extend parallel to an axis of the capacitive element 1 and as illustrated beyond one end of the element.

Figure 2:
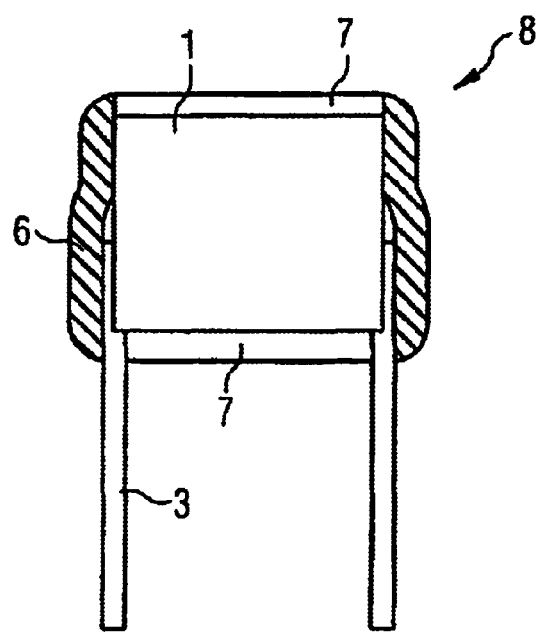
FIG. 2 is a side view with portions broken away for purposes of illustration of the capacitive element covered with thermo plastic shrinkable material.

In FIG. 2, the capacitive element 1 has an already shrunken thermo shrinkable plastic material cover 6 which serves as the capacitor mechanical protection and electrical insulation for the capacitor 8. The mechanical protection results from the pressure by the thermo shrinkable cover 6 on the terminals 3 and on the film 2 of the capacitor 8, which guarantees the welding integrity, and by consequence the contact between terminals 3 and the films 2 of the capacitor 8 and avoids the use of plastic cans.

The electrical insulation of electrodes or films 2 of the capacitor 8 is done by the cover insulating material characteristic used on the capacitive element 1. In case of a capacitor 8 with mechanic preformed terminals 4, the preforming serves to support the component on the PCB board (not shown) where the mentioned component is set up and as delimination of the thermo shrinkable plastic 6.

The invention can be practiced with any thermo shrinkable material 6, since this material provides the required electrical and thermo isolation as well as provides the capacitor 8 with an adequate mechanical resistance.

The areas 7 on the superior and inferior parts or ends of the capacitor 8 are either open and exposed to the ambient atmosphere or can be sealed with resins like epoxy or polyurethane.

The manufacturing method for a capacitor 8, as shown in FIGS. 3 to 6, consists of covering the capacitive element 1 with the thermo shrinkable material, which usually is supplied in tubes and has been cut in adequate sizes or lengths so that as the tube is placed over the element 1, the extremities cover enough of the ends of the capacitive element 1 to provide the capacitor 8 with the adequate mechanical protection after shrinking. As illustrated in FIGS. 4 and 5, the axis of the tube or cover 6 extends parallel to the axis at the element 1 and the terminals 3.

In a next step, the capacitor 8 goes through a heater (not shown) which makes the referred thermo shrinkable material 6 shrink, and stick perfectly to the capacitive element 1 as shown in FIG. 6.

What is claimed is:

1. A capacitor consisting of a capacitive element having an outer surfaces extending along an axis between two ends, a pair of contact terminals engaging the outer surface and extending from one of the two ends parallel to the axis, and a cover consisting of a thermo shrinkable plastic tube having a length greater than the capacitive element surrounding the capacitive element with the axis of the tube being parallel to the pair of contact terminals, said plastic tube being shrunk down onto the capacitive element to press the pair of contact terminals against the outer surface of the element.

2. A capacitor according to claim 1, wherein the cover is flexible cover.

3. A capacitor according to claim 1, wherein the cover exposes a portion of each of the two ends of the capacitive element.

4. A capacitor according to claim 1, wherein the capacitive element is a dry capacitive element.

5. A method for manufacturing a capacitor consisting of a cover receiving a capacitive element having an outer surfaces extending along an axis between two ends, said method comprising the steps of providing a capacitive element; attaching a pair of contact terminals to the outer surface of the element to extend from one of the two ends of the element parallel to the axis; inserting the capacitive element into a thermo shrinkable tube with an axis of the tube being parallel to the axis of the element and the pair of contact terminals extending beyond one end of the tube; and then applying heat to shrink the tube onto the capacitive element and to press the contact terminals against the outer surface of the element.

6. A method according to claim 5, wherein the step of applying heat includes placing the capacitive element in the shrinkable tube into a heating device.

\* \* \* \* \*